Dec. 14, 1926.
F. O. V. HIERGESELL
HYDROMETER
Filed April 1, 1926
1,610,606
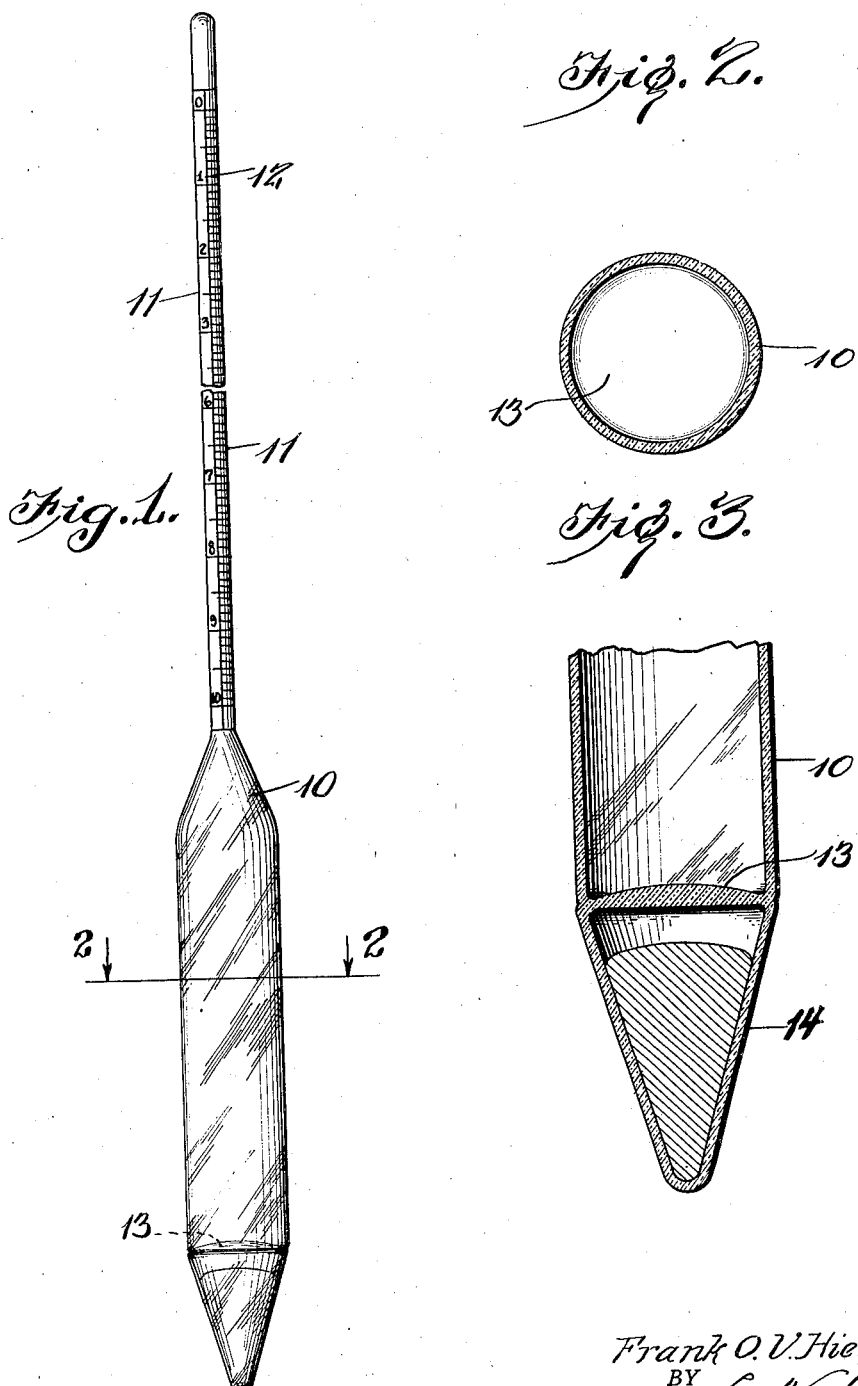
INVENTOR
Frank O. V. Hiergesell,
BY L. N. Quiley
ATTORNEY Patented Dec. 14, 1926.

1,610,606

UNITED STATES PATENT OFFICE.

FRANK O. V. HIERGESELL, OF PHILADELPHIA, PENNSYLVANIA

HYDROMETER.

Application filed April 1, 1926. Serial No. 99,121.

This invention relates to measuring and has special reference to hydrometers such as are used for measuring the densities of aqueous solutions, oils and other liquids.

In the ordinary construction of hydrometers these instruments consist of a cylindrical float chamber having a reduced hollow stem at its upper end and a weight chamber at its lower end containing mercury, shot or the like, the weight chamber being connected to the float by a constricted neck, which is sealed off in case of mercury weighted hydrometers, so that the mercury or shot cannot pass into the float chamber. The stem is provided with a scale having divisions of proper character for the density determination desired as is well understood by those skilled in the art. Such instruments have a number of defects among which may be mentioned the danger of breakage due to the constricted neck, and the difficulty of cleaning due also to this neck.

Other hydrometers have no separate weight chamber, the ballast being carried in the float chamber but not sealed off permanently and are liable to breakage on that account.

One important object of the invention is to provide an improved hydrometer wherein the constriction of the neck will be eliminated.

A second important object of the invention is to provide a hydrometer wherein there is no constriction dividing the float chamber from the weight chamber but in which the weight is permanently sealed off.

A third important object of the invention is to provide an improved hydrometer wherein the shape is such that the center of gravity of the weight is in the axis of the instrument, a construction difficult to obtain with the constricted neck because of the liability of the bulb getting out of alinement when the neck is heated for sealing off during manufacture of the instrument.

A fourth important object of the invention is to provide a hydrometer having an improved shape of such character as to ensure greater stability and less oscillation during use.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a side elevation of a hydrometer constructed in accordance with the invention.

Figure 2 is a section on the line 2—2 of Figure 1.

Figure 3 is a vertical diametrical section through the lower part of the instrument.

In constructing the instrument there is provided a tube of glass of suitable thickness, the glass being preferably thicker than that commonly used for these instruments. At one end this tube is drawn out to form a hollow stem and sealed at the top. Thus there is provided a main float portion 10 and a hollow stem 11 which latter has the desired graduations 12. The lower end of the float chamber 10 is sealed off with a glass disk 13 fused to the tube, and to this disk is fused the open upper end of an inverted conical weight chamber 14, the base of the cone being of the same diameter as the tube which forms the body 10. Thus, the device has a cylindrical body which merges smoothly and without constriction into the conical weight chamber. In this chamber is placed the required weight of shot, mercury or the like.

It will be seen that this construction provides a weight chamber that is permanently sealed off from the float chamber and that there is no fragile neck between the two to readily break or to prevent cleaning, the smooth exterior of the instrument being easy to access for a cleaning cloth at all points. Moreover, the peculiar conical shape of the weight chamber enables it to be readily alined with the tube so that the center of gravity of the weight lies, in use, in the axial line of the float chamber and stem parallel with weight and center of mass. Also this conical shape is found to reduce oscillation and ensure greater stability.

There has thus been provided a simple and efficient device of the kind described and for the purpose specified.

Having thus described the invention, what is claimed as new, is:

A hydrometer having a hollow cylindrical body prolonged at its upper end in a reduced hollow stem bearing a scale, a disk permanently fixed to the lower end of the body, a hollow inverted cone having a base of the same diameter as the body and permanently fixed to said disk with the axis of the cone coincident with the axis of the body and stem, and a weight in said cone.

In testimony whereof I affix my signature.

FRANK O. V. HIERGESELL.